Figure 1:
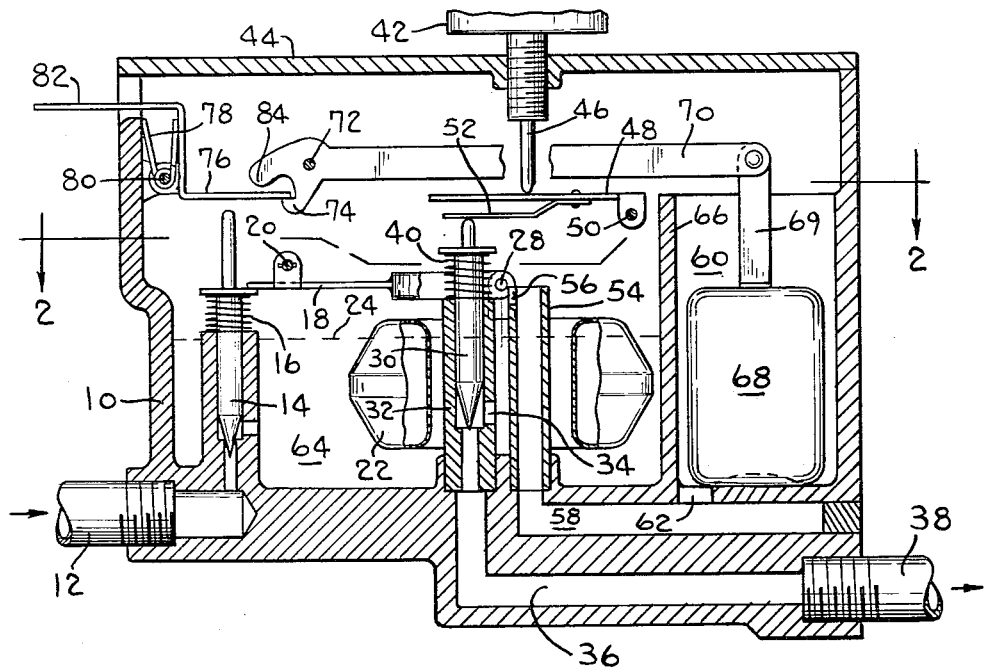

INVENTOR.
LOURDES V. McCARTY

United States Patent Office 2,774,372
Patented Dec. 18, 1956

2,774,372

TILTABLE CONTROL VALVE HAVING SAFETY TRIP-OUT

Lourdes V. McCarty, Milwaukee, Wis., assignor, by mesne assignments, to Controls Company of America, Schiller Park, Ill., a corporation of Delaware Application January 18, 1955, Serial No. 482,576

7 Claims. (Cl. 137—400)

This invention relates to a constant level liquid control valve having a safety trip-out mechanism operable upon occurrence of an undesirable high liquid level in the control casing. More particularly, this invention relates to an oil control of the type described which is unaffected by tilting the control as encountered in trailer, boat and other similar installations. Constant level controls for such installations have not heretofore had such a safety trip-out mechanism, but have employed an overflow (to the outside of the trailer, for example) which has been demonstrated to be lacking in safety features.

The principal object of this invention is to provide a tiltable constant level oil control valve having a safety trip mechanism.

Another object is to provide a control of the type described which may be tilted on any axis without materially affecting the accuracy of the overflow level or the head on the outlet valve.

Figure 2:
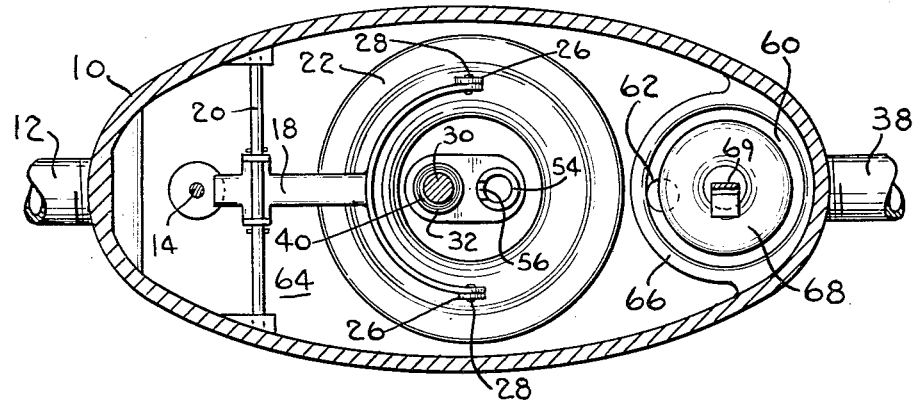

Other objects and advantages will be pointed out in, or be apparent from, the specification and claims, as will obvious modifications of the single embodiment shown in the drawings in which:

Fig. 1 is a vertical section through a partially schematic constant level valve incorporating the present invention; and Fig. 2 is a horizontal section of the control taken as indicated by line 2—2 on Fig. 1.

Referring to the drawings in detail, the control has a main casing 10 having inlet 12. Valve 14 is biased towards the open position by spring 16 and is regulated by lever 18 pivoted on shaft 20 mounted in the casing and connected to annular float 22 to regulate the action of the valve to maintain a constant level in the casing. The level maintained is indicated by dotted line 24. It will be noted that lever 18 is in the form of a yoke connected to ears 26 on the float by pins 28 to allow the float to adjust to various angles along the major axis of the casing 10. This type of float mounting is preferable in that it gives better regulation of the level within the casing when the casing is tilted, but the present invention is not limited to such a float mounting since a fixed connection to the float provides satisfactory regulation of the level even though not as accurate as that illustrated.

Outlet valve 30 is mounted in sleeve 32 with the actual outlet located at 34 substantially along the center line of annular float 22. The oil in the casing flows through outlet 34 past valve 30 to conduit 36 and pipe 38 which leads to the burner, not shown. Outlet valve 30 is biased towards its open position by spring 40 and its position is determined by means 42 mounted on casing top 44 and having pin 46 which acts on lever 48 pivoted at 50. Leaf spring 52 on the underside of lever 48 transfers the motion to the upper end of outlet valve 30 while absorbing any overtravel of means 42 and pin 46. Means 42 can be a manual or automatic control acting on the leverage which regulates the valve motion. The actual form of the outlet valve setting adjustment is of no importance in so far as the present invention is concerned.

Overflow standpipe 54 is provided with notch 56 which permits oil to flow into the standpipe when the level reaches the bottom of the notch. The oil flowing into the pipe flows through conduit 58 and up into overflow chamber 60 through port 62. The overflow chamber is separated from the main chamber 64 by wall 66 which is high enough to prevent oil from flowing directly from the main chamber to the overflow chamber over the wall in any position in which the control might be inclined in operation. When the overflow oil enters chamber 60, the float 68 will ultimately rise to act through link 69 to rock lever 70 about pin 72 and withdraw jaw 74 from the illustrated position in which it supports striker 76. When the jaw releases the striker, spring 78 acts on the striker to rotate the striker about pin 80 and drive downwardly onto the upper end of inlet valve 14 to close the valve.

In normal operation, therefore, annular float 22 acts on the inlet valve through lever 18 to regulate the inlet valve to maintain a constant level 24 within main chamber 64. If, for any reason, the level within the main chamber should become excessively high, the oil will flow from the main chamber to the overflow chamber 60 through notch 56 in standpipe 54, conduit 58, through port 62 into the overflow chamber. The rising oil level in the overflow chamber will cause safety float 68 to rise and act through lever 70 to release striker plate 76 to drive the inlet valve shut and prevent further oil flow into the control. After the difficulty which occasioned the increase in oil level within the main chamber has been remedied, the exposed end 82 of the striker can be pushed downwardly to cause the striker to bear against nose 84 of lever 70 to push safety float 68 down in chamber 60. This will, of course, cause the level in the chamber 60 to rise which will in turn cause the oil in the overflow chamber to flow back into main chamber 64 through standpipe 54.

Since the standpipe notch 56 is located substantially at the center line of the annular float, the actual overflow level will remain substantially constant regardless of the degree of tilt imparted through the casing (within the realm of normal contemplated operating conditions). Similarly, since outlet 34 is located substantially at the center line of the annular float, the actual head of oil acting on the outlet will remain substantially constant even though the casing may be tilted. This is true since the float acts to maintain the level at the float center line substantially constant and this is the only level with which one need be concerned. Thus, referring particularly to Fig. 2, it will be noted that the outlet valve is not on the center line of the casing along the major axis of the casing, but this has no bearing on the accuracy of the metering of the flow through the outlet 34.

Although but one embodiment of the present invention has been illustrated and described, it will be apparent to those skilled in the art that various changes and modifications may be made therein without departing from the spirit of the invention or from the scope of the appended claims.

I claim:

1. A constant level control valve comprising, a casing having an inlet, a valve for the inlet, an annular float in the casing and connected to the valve for regulating the valve action to maintain a constant level in the casing, an outlet from the casing located substantially centrally of the float, a valve for regulating flow through said outlet, a wall defining an overflow chamber in the casing and having sufficient height to preclude flow over the wall, a safety float in the chamber, a striker plate above the inlet valve, means biasing the striker towards the valve to close the valve, means retaining the striker in an inoperative position and connected to the safety float to release the striker when the level in the overflow chamber reaches a predetermined level, and conduit means originating substantially centrally of the annular float and terminating in the chamber, said conduit means originating at an overflow level above said constant level so liquid in the casing will flow through the conduit means into the overflow chamber when the level in the casing reaches the overflow level.

2. A constant level valve comprising, a casing having an inlet to a main chamber, a valve for the inlet, a main float in the chamber and connected to the valve to regulate the valve movement in accordance with the level in the casing, an outlet conduit connected to the interior of the chamber casing to receive flow therefrom from a point subtsantially on the vertical center line of the float, a valve for the outlet, and overflow chamber in the casing and separated from the main chamber by a wall having sufficient height to preclude flow over the wall, a safety float in the overflow chamber, a striker for closing the inlet valve, means biasing the striker in the valve closing direction, means connected to the safety float and operative to hold the striker from closing the valve and to release the striker when the safety float floats, and conduit means between the overflow chamber and a point substantially on the vertical center line of the main float and operable upon occurrence of a predetermined high level in the main chamber to allow flow from the main chamber to the overflow chamber.

3. A valve according to claim 2 in which the conduit means includes a standpipe in the main chamber.

4. A valve according to claim 3 in which the float is centrally apertured and the standpipe projects into the aperture.

5. A valve according to claim 4 in which the outlet conduit has an opening into the main chamber substantially on the center line of the float aperture, and the standpipe has an opening substantially on the center line of the float aperture.

6. A valve according to claim 5 in which the outlet conduit and the standpipe are slightly off the float aperture center line and the openings in the outlet conduit and the standpipe face the aperture center line.

7. A valve according to claim 6 in which the outlet valve is positioned in the outlet conduit within the float aperture, and means for operating the outlet valve.

References Cited in the file of this patent
UNITED STATES PATENTS

| | | |
|---|---|---|
| 2,401,312 | McCarty | June 4, 1936 |
| 2,592,913 | Landon | Apr. 15, 1952 |